(12) United States Patent
Bielek et al.

(10) Patent No.: US 8,980,024 B1
(45) Date of Patent: Mar. 17, 2015

(54) SOLID SURFACE INTERLOCK INSERTS

(75) Inventors: Stephen Bielek, Willoughby, OH (US); Christopher J. Corradino, Oakwood Village, OH (US); Marc Corradino, Oakwood Village, OH (US)

(73) Assignee: Custom Solid Surface, LLC, Oakwood Village, OH (US)

( * ) Notice: Subject to any disclaimer, the term of this patent is extended or adjusted under 35 U.S.C. 154(b) by 643 days.

(21) Appl. No.: 12/352,456

(22) Filed: Jan. 12, 2009

Related U.S. Application Data

(62) Division of application No. 11/329,938, filed on Jan. 11, 2006, now Pat. No. 7,491,437.

(51) Int. Cl.
*B44C 1/26* (2006.01)
(52) U.S. Cl.
CPC ...................................... *B44C 1/26* (2013.01)
USPC .............................. 156/63; 156/256; 156/257
(58) Field of Classification Search
CPC ....................................................... B44C 1/26
USPC ..................................... 156/256, 250, 63, 257
See application file for complete search history.

(56) References Cited

U.S. PATENT DOCUMENTS

| | | | |
|---|---|---|---|
| 3,634,178 A | | 1/1972 | Goodman |
| 3,649,423 A | | 3/1972 | Wilton et al. |
| 3,652,372 A | * | 3/1972 | Klazkin et al. ................ 428/45 |
| 3,737,365 A | * | 6/1973 | Smith ............................. 428/67 |
| 3,852,145 A | * | 12/1974 | Kloweit ........................... 40/616 |
| 4,126,500 A | * | 11/1978 | Palanos ......................... 156/154 |
| 5,660,668 A | * | 8/1997 | Matheson et al. ............ 156/268 |
| 6,238,609 B1 | | 5/2001 | Stecker |
| 6,286,577 B1 | | 9/2001 | Douglas et al. |
| 6,491,852 B1 | | 12/2002 | Sedaka |
| 6,656,561 B1 | | 12/2003 | Subbulu |
| 6,729,010 B2 | | 5/2004 | Dubuc |
| 6,736,173 B1 | | 5/2004 | Grisley et al. |
| 6,770,328 B1 | | 8/2004 | Whaley |
| 6,773,538 B2 | | 8/2004 | Blessing |

(Continued)

FOREIGN PATENT DOCUMENTS

DE   3432681 A1 *  3/1986
EP   0147221 A2    7/1985

OTHER PUBLICATIONS

Nolan, Mike, "CNC Router Brings New Business Opportunities to Solid Surface Specialist", from web site http://www.techno-isel.com/articles/solidsurface.htm, dated Dec. 6, 1998.*

(Continued)

*Primary Examiner* — Jeff Aftergut
(74) *Attorney, Agent, or Firm* — Thompson Hine LLP

(57) ABSTRACT

A system, method, and process for fabricating solid surface inserts for solid surface materials is provided. The solid surface inserts provide additional decorative and/or functional elements to a solid surface material. The solid surface inserts are designed and fabricated to capture the salient features of a desired design in order to integrate the desired design into the solid surface base to create an assembled solid surface. To create the assembled solid surface, the solid surface base has a pocket formed to accept the solid surface inserts. Then, the solid surface inserts are fabricated from other solid surface materials. The fabricated solid surface inserts are then assembled, interlocked, and secured, either with each other and/or with the solid surface base, using an adhesive to create the assembled solid surface.

9 Claims, 7 Drawing Sheets

(56) References Cited

U.S. PATENT DOCUMENTS

| | | |
|---|---|---|
| 6,945,006 B2 | 9/2005 | Stoffer |
| 2003/0057609 A1* | 3/2003 | Ratcliffe ............... 264/400 |
| 2005/0186383 A1 | 8/2005 | Kennedy |
| 2006/0102252 A1* | 5/2006 | Justin ............... 144/372 |
| 2008/0206509 A1* | 8/2008 | Kent et al. ............... 428/67 |

OTHER PUBLICATIONS

The internet archive Wayback Machine indicating that the article on the website "http://www.techno-isel.com/articles/solidsurface.htm" was available as of Dec. 6, 1998.*

Machine translation of DE 3432681, date unknown.*

E.I. DuPont Nemours and Company, Technical Information—Finishing Cohan Surfaces (CTDC-123), http://www.corian.com/corian/documents/pdf/finishcorian.pdf, Available online Jan. 18, 2006.

E.I. DuPont Nemours and Company, Technical Bulletin—Writing Specification #C950-K-3158-74 (Jan. 2004), http://www.corian.com/corian/documents/pdf/Solid%20Surface%20Fabrications.pdf, Available online Feb. 3, 2004.

Techno Inc., Application Note—Solid Surface Meets CNC Router, http://www.techno-isel.com/education1/H870/PDF/H870P084.pdf, Available online Jan. 18, 2006.

* cited by examiner

SOLID SURFACE INTERLOCK INSERTS

CROSS-REFERENCE TO RELATED APPLICATION

This application is a divisional of U.S. Nonprovisional application Ser. No. 11/329,938 filed Jan. 11, 2006.

TECHNICAL FIELD

The present invention relates to methods, devices, and processes for creating and installing inserts in solid surfaces.

BACKGROUND

Solid surface materials are used in a variety of surfacing applications in both commercial and residential settings. Examples of common types of solid surface materials include: manufactured polymer solid surfaces such as Corian®, Lexton®, Avonite®, and Swanstone®; natural solid surface materials such as marble or granite; and other manufactured solid surface materials such as concrete or glass. Solid surface materials are commonly used in a variety of different applications. Some of the more common applications of solid surface materials is for countertops or surfaces on counters, bars, reception areas, tables, windows, and ledges. Other applications include walls, facings, exterior cladding, and partitions.

Solid surface materials come in a wide variety of different colors. The variety of colors and finishes within a given type of solid surface material can number in the several hundreds if not thousands. Manufactured solid surface materials also may come with different highlights, including small accents and other materials molded directly into the solid surface material itself to form a textured pattern. However, these textured patterns are typically evenly dispersed throughout the entire solid surface material with a random pattern. Solid surface materials are typically supplied in sheets which are then cut to fit specific applications either at the job site or by off-site fabricators.

One feature of solid surface materials, and particularly manufactured polymer solid surface materials, is the ability to create a continuous surface that is relatively impervious to moisture and other substances. When multiple sheets of a solid surface material are assembled, the sheets are typically bonded together using a joint adhesive. For example, Corian® sheets may be joined using a joint adhesive, primarily methylmethacrylate, which effectively bonds the sheets together such that the multiple sheets remain relatively impervious to moisture and other substances.

Although solid surface materials, and manufactured polymer solid surfaces in particular have a wide variety of decorative and functional attributes, there are some limitations to their use. Purchasers commonly desire a customized look and feel for a solid surface being installed. One common way to customize the look and feel of a particular installation is to select the color, texture, and finish of the installation. However, the solid surface cannot be manufactured so that specific colors and textures are arranged into specific distinct patterns; rather they are diffused throughout the material. Therefore, there is a practical limit to the ability of a customer to customize a solid surface or to replicate a desired design in the solid surface material.

Therefore, there is a need for a method, device, and process for creating inserts for solid surface materials that enables a customer to recreate a desired design in a solid surface by the inclusion of a patterned insert into the solid surface. Specifically, the customized insert can replicate a number of different decorative or functional shapes, patterns, logos, or other designs as desired by the customer without substantially interfering with the performance of the solid surface.

SUMMARY

The following presents a simplified summary of the invention in order to provide a basic understanding of some of its aspects. This summary is not an exhaustive overview of the invention and is intended to neither identify key or critical elements of the invention nor delineate its scope. The primary purpose of this summary is to present some concepts of the invention in a simplified form as a prelude to a more detailed description that is presented later.

A system, method, and process for fabricating solid surface inserts for solid surface materials is provided. The solid surface inserts provide additional decorative and/or functional elements to a solid surface material. The solid surface inserts are designed and fabricated to capture the salient features of a desired design, which may be presented by a customer. The solid surface inserts may be fabricated from the same type of material as the solid surface they are being integrated into, or from different types of materials in order to achieve other effects. The solid surface inserts are fabricated from multiple pieces which can either be integrated directly with the surface as part of the solid surface fabrication or alternatively assembled into a separate assembly and integrated with the solid surface once the solid surface is installed in its desired location.

BRIEF DESCRIPTION OF THE DRAWINGS

The accompanying figures depict multiple embodiments of the solid surface insert design, fabrication and use. A brief description of each figure is provided below. Elements with the same reference numbers in each figure indicate identical or functionally similar elements. Additionally, the left-most digit(s) of a reference number identifies the drawings in which the reference number first appears.

DETAILED DESCRIPTION

Solid Surface Base Fabrication

Figure 1:
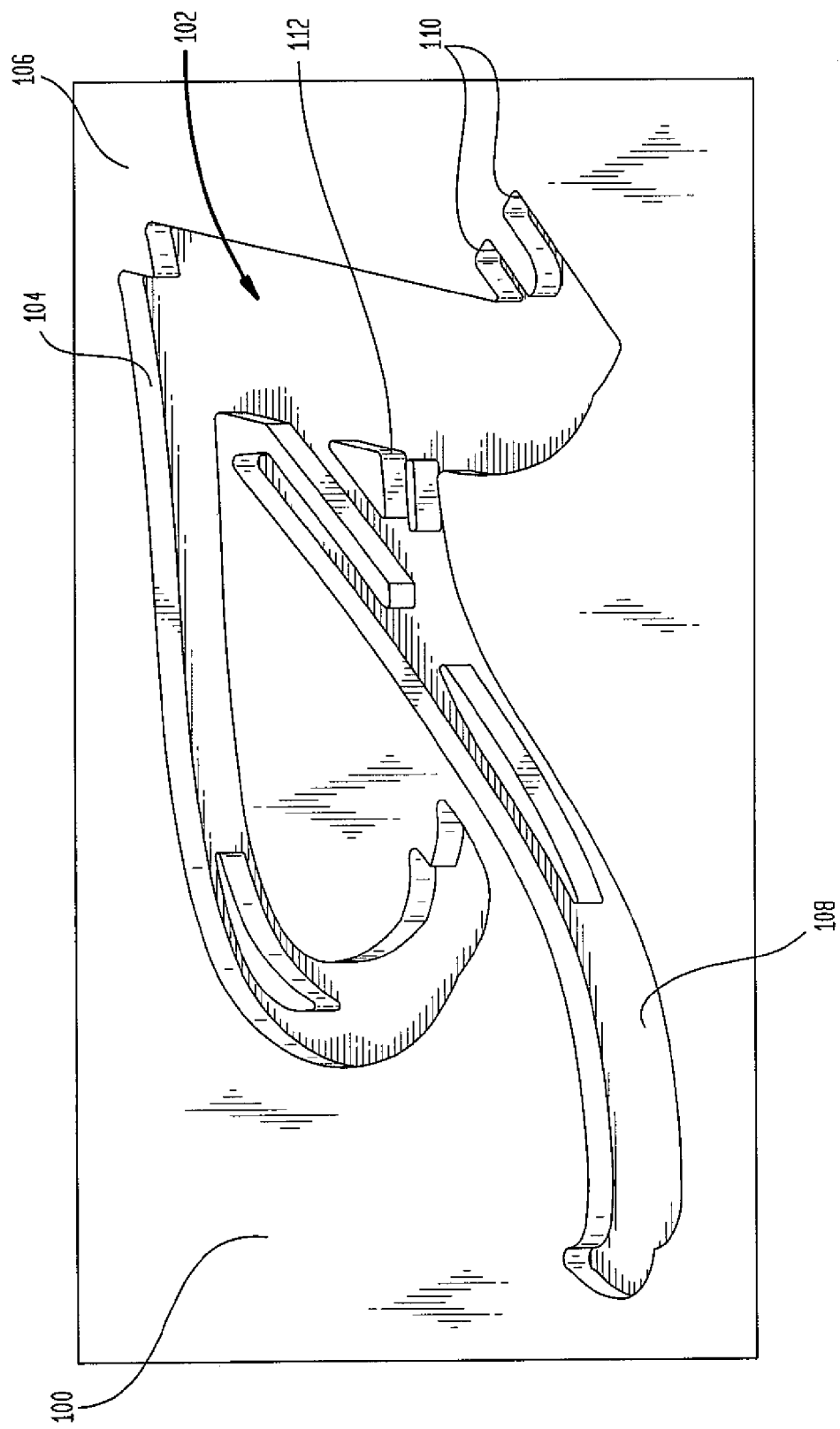
FIG. 1 is a perspective view of a solid surface base prepared to accept one embodiment of a solid surface insert.

FIG. 1 shows a perspective view of a solid surface base 100 prepared to accept one embodiment of a solid surface insert. The solid surface base 100 is a sheet of either a manufactured polymer solid surface material, natural solid surface material, or other manufactured solid surface material. Preferably the solid surface base 100 is a polymer solid surface material such as Corian®.

Material is removed from the solid surface base 100 to form a base pocket 102. The solid surface material is removed from the solid surface base 100 using common processes known to those of ordinary skill in the art such as routing or milling. The base pocket walls 104 are cut to a depth such that when an assembled interlock insert 500 (described in detail below) is placed in the base pocket 102, the upper most surface 502 of the assembled interlock insert 500 is substantially level with the upper surface 106 of the solid surface base 100. Although only one base pocket 102 is depicted for simplicity, the practical limit to the number of inserts placed on a solid surface base 100 is only limited by the available surface area needed for the desired inserts and the need for the solid surface base 100 to retain enough material to maintain the strength of the assembled product necessary for the desired application. The depth of the base pocket is selected such that it is sufficient to accommodate the thickness of the desired design 600 while still remaining less than the thickness of the solid surface base 100. In an alternative embodiment the base pocket may emerge from the bottom of the solid surface base 100 and protrude into a third material under the solid surface base to accommodate larger patterns.

The base pocket floor 108 as shown in this embodiment is substantially at one level. In this embodiment, the assembled interlock insert 500 has a substantially flat bottom face that rests against the base pocket floor 108 when inserted in the base pocket 102. Further the assembled interlock insert 500 fits within the base pocket 102 such that the upper most surface 502 of the assembled interlock insert 500 is substantially flush with or higher than the upper surface 106. Movement of assembled interlock insert 500 within the base pocket 102 is restrained by both solid surface adhesive 404 and the base pocket wall 104 and the base floor 102. In other embodiments of the present invention, the base pocket floor 108 has multiple levels, thereby forming additional base pocket wall 104 areas at a variety of depths that provide additional surfaces for locating interlock insert pieces inside the base pocket 102.

The depth of the base pocket floor 108 and the corresponding height of the base pocket walls 104 are principally determined by multiple factors including the number of inserts necessary for a desired design 600, the thickness of the solid surface base 100, and the strength of the solid surface inserts such as the first solid surface insert 200 and second solid surface insert 300, the assembled interlock insert 500, and the solid surface base 100. In the embodiment depicted in FIG. 1, the base pocket 102 is sized to accommodate a first solid surface insert 200 and a second solid surface insert 300 wherein the second solid surface insert 300 at least partially overlays the first solid surface insert 200. In one embodiment, a solid surface base 100 and inserts 200, 300 comprised of a manufactured polymer solid surface material, the depth of the base pocket 102 is preferably 0.2 and 0.3" and most preferably about 0.25".

Solid Surface Insert Fabrication

Figure 2:
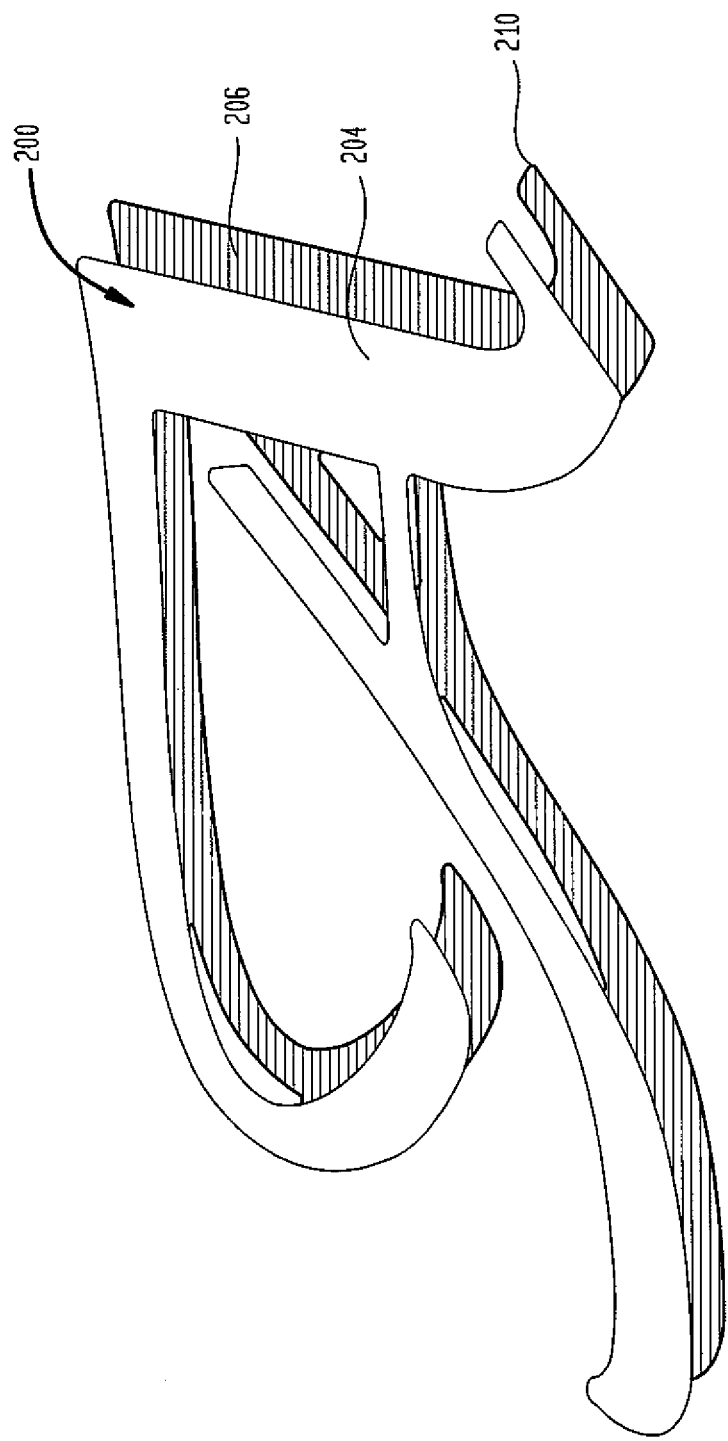
FIG. 2 is a perspective view of one embodiment of a first solid surface insert piece.

Referring now to the first solid surface insert 200 depicted in FIG. 2. The first solid surface insert 200 is fabricated from another piece of solid surface material. Alternative materials for the first solid surface insert 200 include manufactured polymer solid surfaces, natural solid surface materials, other manufactured solid surface materials, metals, ceramics, and glasses. Preferably the materials of the first solid surface insert 200 and the solid surface base 100 are matched. More preferably, the first solid surface insert 200 is a manufactured polymer solid surface material and the solid surface base 100 also comprised of a manufactured polymer solid surface material. Most preferably, the first solid surface insert 200 and the solid surface base 100 are the same brand of manufactured polymer solid surface material.

The initial step in the fabrication of the first solid surface insert 200 is to plane, mill or otherwise machine, using techniques known to those of ordinary skill in the art, the solid surface material blank to the desired thickness if the material is not supplied at the appropriate thickness by the manufacturer. The thickness of the first solid surface insert 200 is dictated by multiple factors including the number of inserts necessary for a desired design 600, the thickness of the solid surface base 100 and the depth of the corresponding base pocket 102, and the as fabricated strength of the respective inserts and base such as the first solid surface insert 200 and second solid surface insert 300, the assembled interlock insert 500, and the solid surface base 100. In the case of the embodiment detailed in the figure, the nominal thickness of the first solid surface insert 200 is preferably between 0.21" to 0.36" and most preferably about 0.31".

The next step in the fabrication process for the first solid surface insert 200 is to remove material inside the overlap zone 204 where the second solid surface insert 300 will overlap the first solid surface insert 200. The shape of the overlap zone 204 is primarily dictated by the shape and orientation of the second solid surface insert 300 relative to first solid surface insert 200. In the embodiment depicted, the second solid surface insert 300 substantially covers entire overlap zone 204 without covering any area of the upper surface 206 outside of the overlap zone 204 and is substantially supported by the first solid surface insert 200. An alternative embodiment has the second solid surface insert 300 substantially covering the entire overlap zone 204, but extending beyond the overlap zone and being substantially supported by other elements of the design including the base pocket floor 108. In the embodiment shown, the nominal thickness of the first solid surface insert 200 in the area of the overlap zone is preferably between 0.08 and 0.25" and most preferably about 0.19". The thickness under the upper surface 206 remains at the nominal thickness of the first solid surface insert 200.

After the first solid surface insert 200 is fabricated with an overlap zone 204 to support the second solid surface insert 300, the next step is to remove the remainder of the material using either milling or cutting operations known to those of ordinary skill in the art. The material is removed from the first solid surface insert 200 to form the desired shape of the first solid surface insert 200 as dictated by the shape of the base pocket 102 and the desired shape 600.

Figure 3:
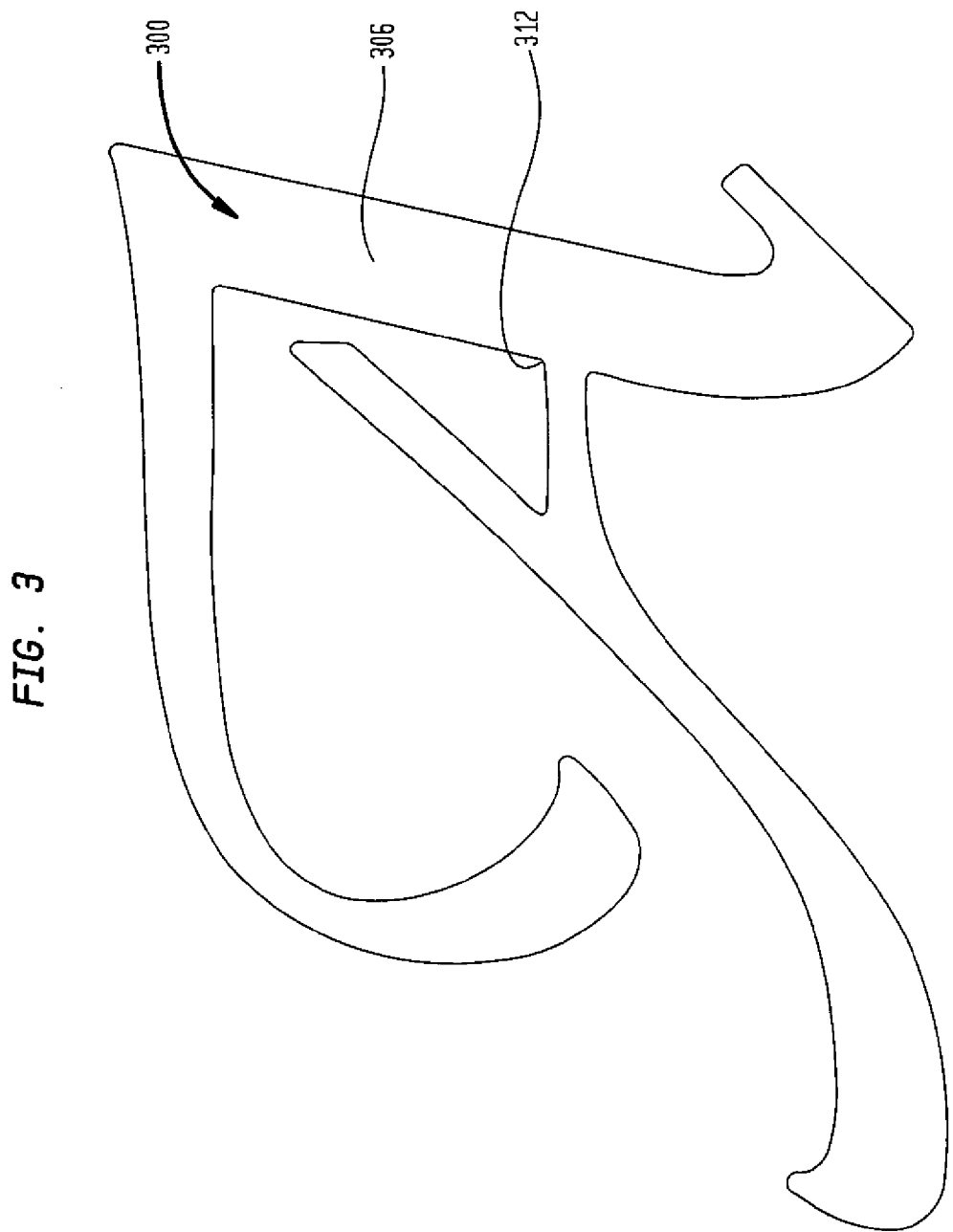
FIG. 3 is a perspective view of one embodiment of a second solid surface insert piece.

Referring now to the second solid surface insert 300 depicted in FIG. 3. The second solid surface insert 300 is fabricated from another piece of solid surface material. The second solid surface insert 300 has an upper surface 300, but no overlap zone 204. Alternative materials for the second solid surface insert 300 include manufactured polymer solid surfaces, natural solid surface materials, other manufactured solid surface materials, metals, ceramics, and glasses. Preferably the materials of the first solid surface insert 200, the second solid surface insert 300, and the solid surface base 100 are matched. More preferably, the second solid surface insert 300 is a manufactured polymer solid surface material and the first solid surface insert 200 and the solid surface base 100 are also comprised of a manufactured polymer solid surface material. Most preferably, the second solid surface insert 300, the first solid surface insert 200, and the solid surface base 100 are the same brand of manufactured polymer solid surface material.

The first step in the fabrication of the second solid surface insert 300 is to plane, mill or otherwise machine, using techniques known to those of ordinary skill in the art, the solid surface material blank to the desired thickness if the material is not supplied at the appropriate thickness by the material manufacturer. The thickness of the second solid surface insert 300 is dictated by multiple factors including the number of inserts necessary for a desired design 600, the thickness of the solid surface base 100, the depth of the corresponding base pocket 102, the depth of the overlap zone 204, and the fabricated strength of the respective inserts and base such as the first solid surface insert 200 and second solid surface insert 300, the assembled interlock insert 500, and the solid surface base 100. In the case of the embodiment detailed in the figure the nominal thickness of the second solid surface insert 300 is preferably between 0.06" to 0.28" and most preferably about 0.19".

After the second solid surface insert 300 has the desired thickness, the next step is to remove the remainder of the material using either milling or cutting operations known to those of ordinary skill in the art. The material is removed from the second solid surface insert 300 to form the desired shape of the second solid surface insert 300 as dictated by the shape and space defined by the extents of the base pocket 102, the first solid surface insert 200, and the desired shape 600.

Although in the embodiment depicted in the figures and described in detail herein has a first solid surface insert 200 and a second solid surface insert 300, it is obvious to one of ordinary skill in the art the same fabrication and design procedure may be repeated so long as sufficient material remains to maintain the strength of the inserts and solid surface base 100 during the fabrication and assembly process in order to form more complex designs and produce a greater array of different color patterns.

Assembly and Finishing Process

Figure 4:
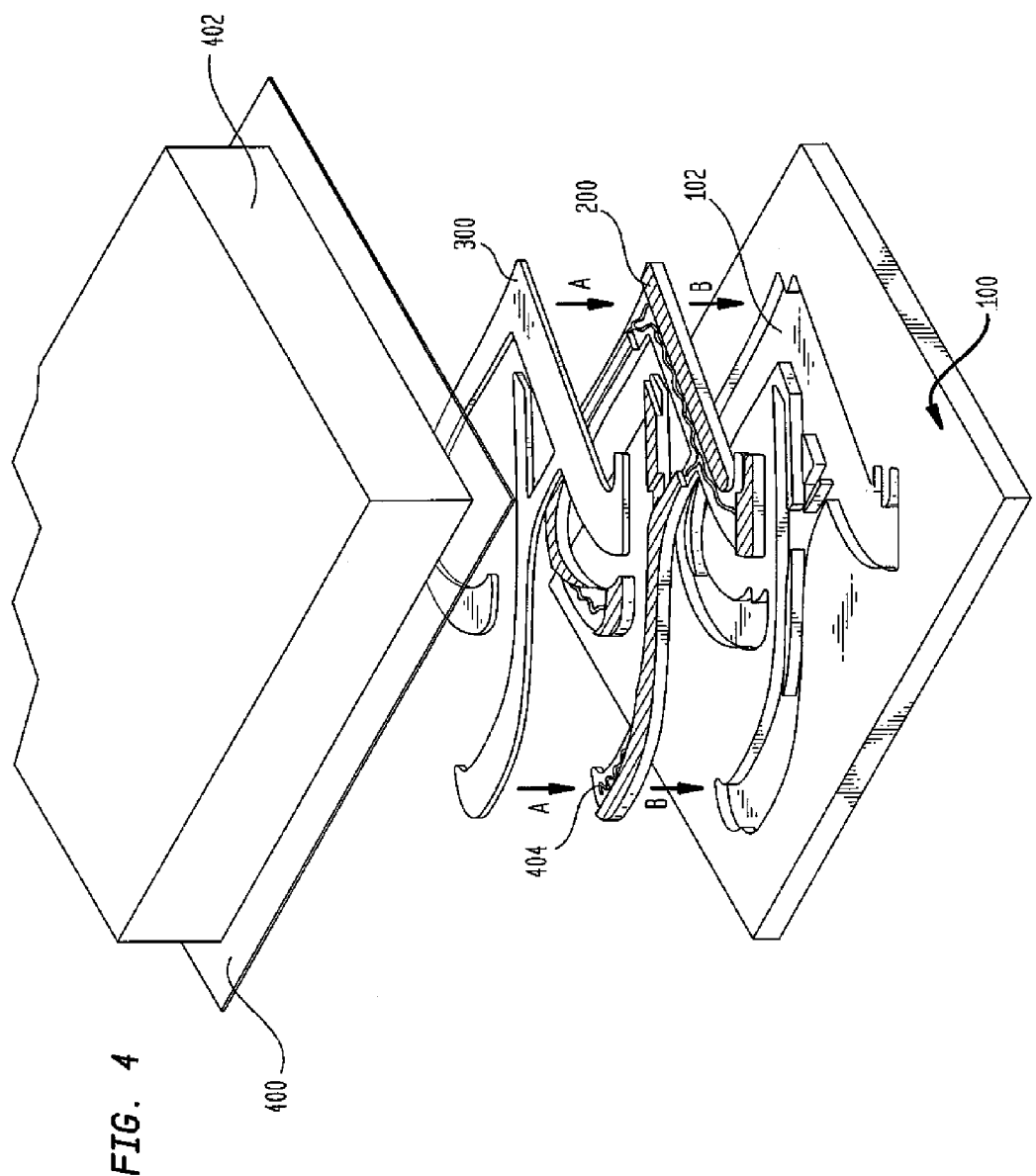
FIG. 4 is an illustration of how one embodiment of a solid surface insert is assembled.

After completing the fabrication of base pocket 102 in the solid surface base 100, and the fabrication of the first solid surface insert 200 and the second solid surface insert 300 (collectively solid surface inserts 200, 300) it is necessary to assemble the elements. Each of the solid surface inserts 200, 300 must be assembled with each other and integrated into the base pocket 102 to form solid surface assembly 510. FIG. 4 highlights the relative stacking between the second solid surface insert 300 into the first solid surface insert 200 and into the solid surface base 100 in the direction of the arrows A, B.

The first step in the assembly process is to clean of all elements of the design in order to remove dust, debris, oils, and other substances that may have accumulated on the elements during the manufacturing, transport, and fabrication processes. The cleaning solution used must be free of chemicals that would adversely effect either the solid surface material or the adhesive used to affix the solid surface pieces together. For manufactured polymer solid surface elements denatured alcohol is used as a cleaning solution. Alternative cleaning solutions may be selected by those of ordinary skill in the art.

After the elements are cleaned, a layer of solid surface adhesive 404 is applied to the areas of the solid surface inserts 200,300 that will be in contact with each other when assembled. A typical assembly process applies the solid surface adhesive 404 to the areas where the base pocket 102 and the first solid surface insert 200 are in contact. After the solid surface adhesive 404 is applied, the first solid surface insert 200 is oriented with and placed into the base pocket 102. Once the first solid surface insert 200 is placed inside the base pocket 102, a solid surface adhesive 404 is applied to the areas of the first solid surface insert 200 and the second solid surface insert 300 that are in contact with each other and the areas of the second solid surface insert 300 that is in contact with the base pocket 102. After the solid surface adhesive 404 is applied, the second solid surface insert 300 is oriented with and placed into the areas formed by the first solid surface insert 200 and the base pocket 102.

Another embodiment of the installation process uses the solid surface adhesive 404 to attach inserts together separate from the solid surface base 100 to create an assembled interlock insert 500. The assembled interlock insert 500 can then be stored and moved separately from the solid surface base 100 in order to protect the assembled interlock insert 500 until it is time to affix the assembled interlock insert 500 into the solid surface base 102 and finish the fabrication process. The solid surface base 100 can have the base pocket 102 fabricated either on-site or off-site. Once the solid surface base 100 is installed at the job site, the assembled interlock insert 500 is then joined with the solid surface base 100 using the cleaning and adhesive procedures described above in order to create the solid surface assembly 510.

Once the elements are assembled with the solid surface adhesive 404, a thin membrane 400 is installed overtop the solid surface assembly 510. The membrane 400 substantially covers the assembled interlock insert 500 and may also cover a substantial portion of the solid surface base 100 as well. The membrane 400 protects the solid surface assembly 510 while the solid surface adhesive 404 cures. The membrane 400 also provides a protective covering whereby a weight 402 is placed on the membrane 400, on top of the assembled interlock insert 500 to ensure the elements are bonded together levely and fully. The membrane 400 also protects the solid surface assembly 510 from being marred by the weight 402 and for the weight from adhering to the solid surface adhesive 404. The membrane 400 can be made from a number of different materials known to those of ordinary skill in the art including wax paper, plastic sheets, and paper. The weight 402 maybe selected from a number of different materials, including bags filled with different materials including sand or lead shot or large physical objects. The weight 402 is removed from the membrane 400 after the solid surface adhesive 404 sets and cures. The time for the solid surface adhesive 404 to set and cure varies according to a number of factors including the relative humidity and temperature of the environment as well as the characteristics of the solid surface adhesive 404 and the amount used. In a nominal scenario with methymethacralte, a solid surface adhesive 404 commonly used with solid surface materials such as Corian®, the cure time is between 20 to 40 minutes.

Once the solid surface adhesive 404 is set and cured, the solid surface assembly 510 is ready for finishing. The finishing process is primarily comprised of sanding and polishing steps. Typically a random orbital sander with micron sanding discs are used for solid surface materials. Prior to sanding, non-adhering portions of the membrane 400 are removed from the surface. Any remaining portions of the membrane 400 are then sanded away as part of the final surface preparation process. Alternatively, the membrane 400 may be removed in its entirety by the sanding discs as part of the final surface preparation process. Commonly, for a matte surfaced manufactured polymer solid surfaces the sanding starts with a 180 to 220 grit sand paper. For semi-gloss surfaces the sanding starts with 400 grit sand paper. As the surface of the solid surface assembly 510 is smoothed, the grit level is increased until ultimately the final polishing is completed with a wool or other fine polishing pad and potentially a fine polishing compound. Persons of ordinary skill in the art easily identify and use alternative sanding and polishing steps in order to smooth discontinuities in the solid surface assembly 510 and provide a consistent finish.

Desired Design Adjustment

Figure 6:
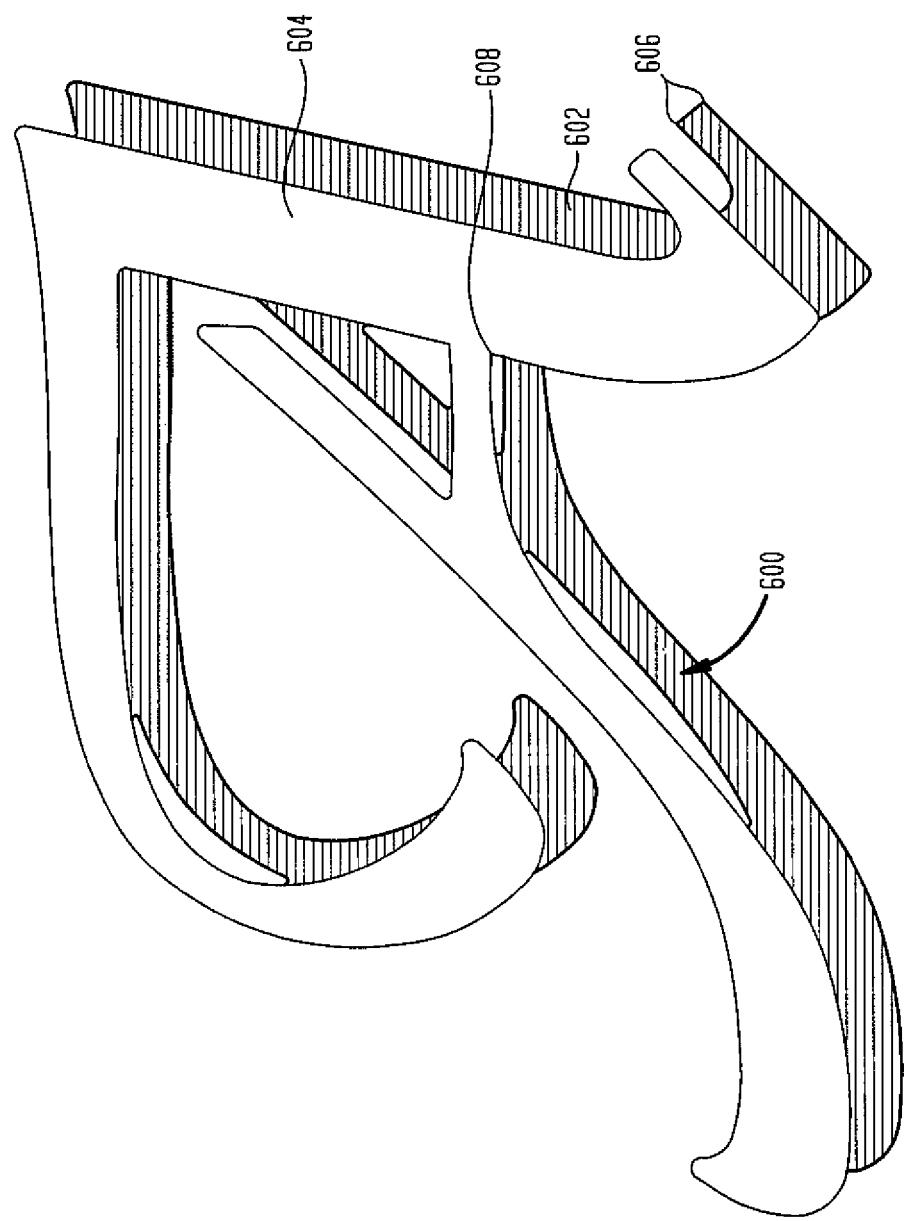
FIG. 6 shows an original desired design prior to conversion into a solid surface insert.

The design for the base pocket 102 is based on and representative of a desired design 600 shown in FIG. 6. In this particular exemplary embodiment, the desired design 600 has a first color 602 and a second color 604. The design process to adjust the desired design 600 from typically, but not always, a two-dimensional image, into a solid surface interlock design may take multiple steps. First, the size of the desired design 600 is scaled to a size that is appropriate for the type of installation. Next, the features of the desired design 600 are analyzed to determine if specific features are too small for fabrication due primarily to the inability to fabricate those features with enough material to maintain sufficient strength to support themselves during fabrication. Those features that are too small for fabrication are eliminated from the design, scaled up, or combined with other nearby features to preserve the overall integrity of the desired design 600 based on aesthetics and desired customer outcomes.

After scaling, the desired design 600 is analyzed to determine common colors that are effectively contiguous with each other and are thus able to be formed from a single piece of solid surface material. In the depicted embodiment, there is a first color 602 and a second color 604. The second color 604 is contiguous along the entire surface of a second solid surface insert 300, while the first color 602 can be formed as part of a single contiguous first solid surface insert 200. The proper colors, shapes, and orientations matching the scaled desired design 600 are then placed in proper relationship to each other in this manner. In the embodiment depicted, the desired design 600 can be replicated using only a first solid surface insert 200 and a second solid surface insert 300. However, multiple layers of inserts may be stacked at different depths without substantially modifying the procedure used. In alternative embodiments it is possible for solid surface inserts to be fabricated as singular elements which are then fitted together in the same procedure outlined above.

After scaling and estimating the number of solid surface inserts necessary to replicate a given desired design 600, the next step in the design adjustment process is to ready the desired design 600 for fabrication. Depending on the desired design 600 there are several adjustments that may be necessary. One adjustment is to compensate for features such as a square open corner 606 in the desired design 600. A square open corner 606 requires a matching square corner to be machined in the base pocket 102. A square open corner 606 in a blind pocket such as the base pocket 102 is both expensive and time consuming to fabricate. Therefore, the desired design 600 maybe adjusted such that the square open corner 606 can be chamfered or radiused. The modification of the desired design 600 for a square open corner 606 is shown in the radius open corner base pocket 110 and the radius open corner 210 of the first solid surface insert 200. Typically if the depth of the pocket is greater than 3 times the diameter of the radius then a chamfer is preferred to ensure smooth machining of the base pocket 102. In cases where the desired design 600 is not suitable for chamfering or radiusing an alternative processes is to create a relief hole in the solid surface base 100. The relief hole would be substantially centered on the point where the base pocket walls 104 come together. After the parts are assembled, the relief hole is filled with an adhesive fill material color matched to the solid surface base 100. The adjustment for a square open corner 606 can be performed on any or all of the solid surface inserts used on a given desired design 600 and their mating base pockets 102 as necessary for fabrication.

A second type of corner adjustment compensates for features such as a square closed corner 608 in the desired design 600 in a similar manner to the compensation used for a square open corner 606 discussed above. However, a square closed corner 608 poses a similar fabrication challenge whereby fabricating the desired design 600 is both expensive and time consuming. Therefore, the desired design 600 is adjusted such that the square closed corner 608 is chamfered or radiused. The modification of the desired design 600 for a square closed corner 608 is shown in the radius closed corner 312 on the second solid surface insert 300, and the mating radius closed corner base pocket 112. The adjustment for a square closed corner 608 can be performed on any or all of the solid surface inserts used on a given desired design 600 and their mating base pockets 102 as necessary for fabrication.

Figure 7:
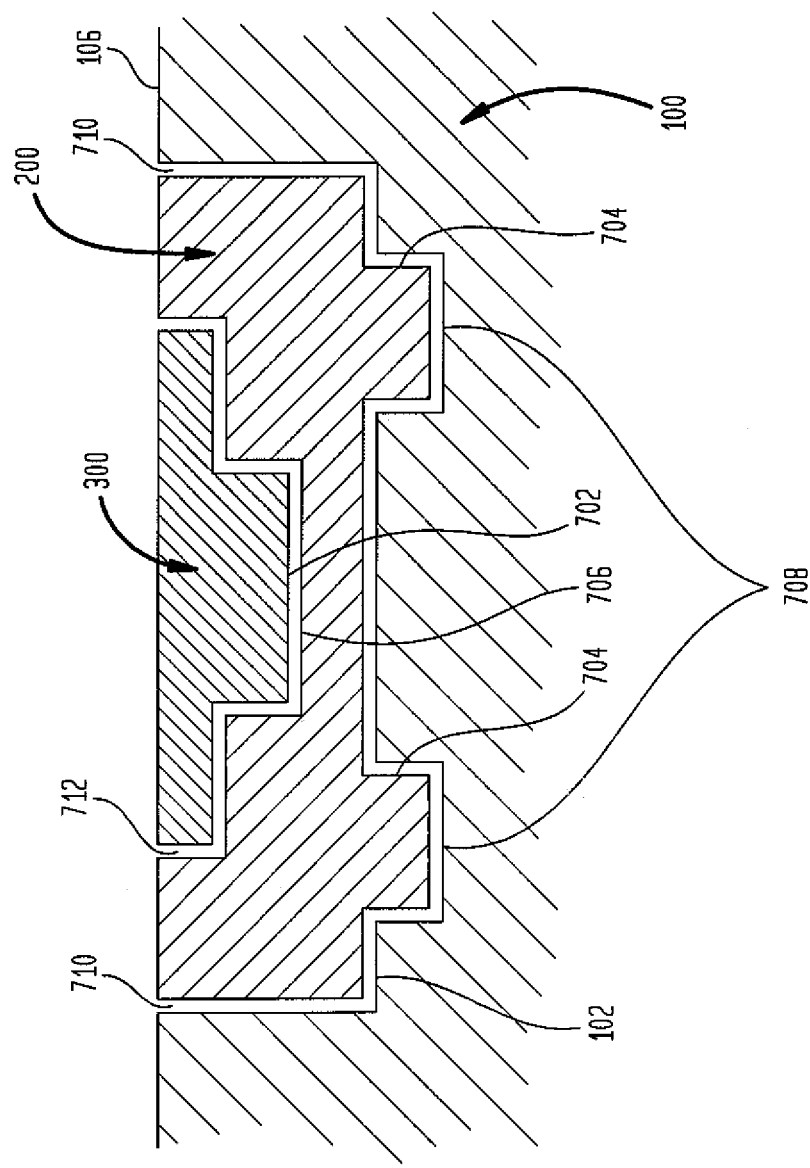
FIG. 7 is a cross sectional view of another embodiment of a solid surface insert using protrusions to locate the solid surface insert in the completed assembly.

Another type of adjustment compensates for floating or non-contiguous pieces. In the case of designs not amenable to fabrication of each solid surface insert part as a single contiguous piece, multiple parts are assembled as non-contiguous components. These non-contiguous elements are locked into the solid surface base 100 to form the assembled interlock insert 500 using alternative design approaches. One approach is to provide an additional locking mechanism for the solid surface inserts by including a protrusion on the parts thereby reducing the reliance on the sides of the solid surface inserts for locating or locking the parts together. In one embodiment, shown in FIG. 7, a first solid surface insert 200 and a second solid surface insert 300 are shown with a first protrusion 704 and a second protrusion 702 respectively. The second protrusion 702 is sized to fit within a second receptacle 706 milled into the first solid surface insert 200. The interface between the second protrusion 702 and the second receptacle 706 effectively locates the second solid surface insert 300 relative to the first solid surface insert 200. Similarly, the first protrusion 704 is sized to fit within a first receptacle 708 formed within the base pocket 102. The interface between the first protrusion 704 and the first receptacle 708 effectively locates the first solid surface insert 200 relative to the solid surface base 100. The use of protrusions 702, 704 rather than interfaces between walls reduces reliance on the interface between the edges and walls of the solid surface inserts 200, 300 relative to each other and the solid surface base 100 to locate the parts and enable accommodation of designs with non-contiguous components.

Figure 5:
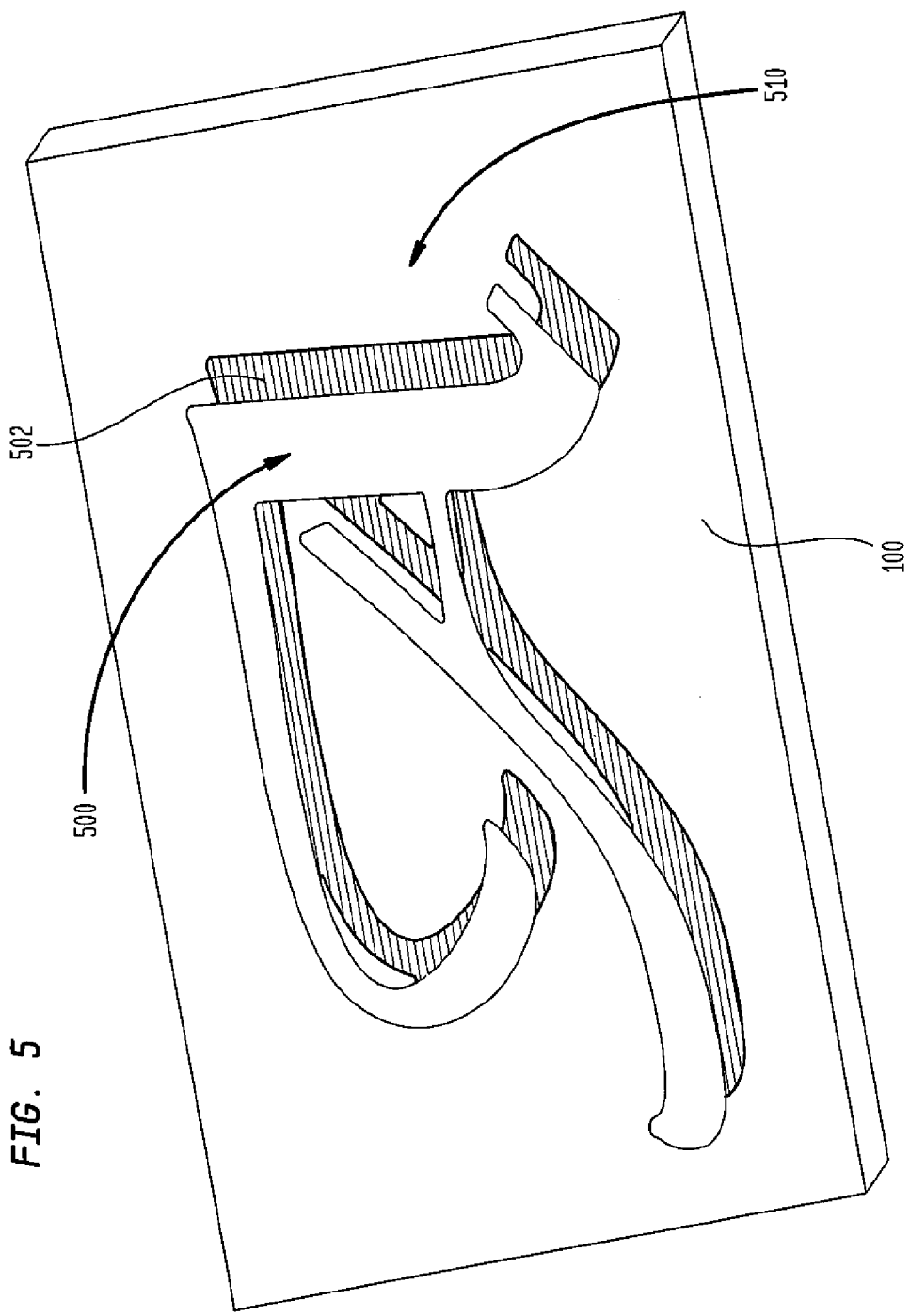
FIG. 5 is an perspective view of one embodiment of an assembled solid surface insert in a solid surface material.

Another desired design 600 adjustment compensates for tolerance stack-up between the parts necessary to enable integration of the assembled interlock insert 500 and insertion of the assembled interlock insert 500 into the solid surface base 100. For example, the base pocket walls 104 nominally form a perpendicular or obtuse angle with the base pocket floor 108. The dimensions of the base pocket wall 104 are sized using design criteria well known to those or ordinary skill in the art to provide sufficient tolerance for an assembled interlock insert 500 to fit into the base pocket 102. The fit between the edges of an assembled interlock insert 500 and the base pocket wall 104 may comprise either a clearance, transition, or interference fit as known to those or ordinary skill in the art. The fit as shown in the embodiment depicted in FIG. 5 is a clearance fit whereby there is clearance between the base pocket wall 104 and the corresponding edges of the assembled interlock insert 500. Similarly the fit between the first solid surface insert 200 and the second solid surface insert 300 are toleranced for the desired fit as well. The depicted clearance fit shown in FIG. 5 provides nominally between 0.015" and 0.020" gap between individual insert pieces 200, 300 and the base pocket 102. In different embodiments, tighter or wider tolerances are selected based on the performance of equipment used to fabricate the insert pieces and the base pocket 102, the desired design 600, and other factors known to person of ordinary skill in the art.

Another adjustment to the desired design 600 is the inclusion of a fill material gap 710 between the edges of the assembled interlock insert 500 and the base pocket wall 104. The size of the assembled interlock insert 500 is smaller in comparison to the typical fit into the base pocket 102 thereby creating a fill material gap 710. The fill material gap 710 is then filled, during the final fabrication process with an adhesive fill that includes an alternative color or highlighting material to setoff the assembled interlock insert 500 from the solid surface base 100. The alternative color or highlighting material maybe blended together such that it varies continuously over length of the fill material gap 710 around the assembled interlock insert 500. A second fill material gap 712 may also be formed between individual solid surface inserts 200, 300 such as between the first solid surface insert 200 and the second solid surface insert 300.

The adjustment of the desired design 600 can be integrated into a series of automated or semi-automated steps as part of manual or computer-aided manufacturing system. For example, in the case of an expert system based computer-aided manufacturing (CAM) system the adjustments are conceptualized as a series of design rules necessary to adjust a desired design 600 into a design suitable for the solid surface assembly 510. The design rules are then sequenced and arrayed into a logical hierarchy of decisions, thereby forming a logic tree, using understood expert system design approaches. The expert system can then automatically perform the adjustment to the desired design 600 using the logic tree to create a design suitable for the solid surface interlock process to create the solid surface assembly 510. The process can operate in either a completely automated fashion or enable a user to interact with the expert system to tailor the design adjustments to best reflect their perception of critical elements of the desired design 600 to be reflected in the solid surface assembly 510. Finally, as part of the expert system design process, cost estimating tools can be integrated with the system to provide estimated costs and fabrication estimates for a desired design 600.

The expert system adjustment process can be accessed in a number of ways. In one embodiment, the expert system is integrated into an online process whereby a user can access the system over a wide area network such as the Internet to submit an electronic version of a desired design 600. The user can then interact with the expert system through an internet browser such Explorer® or Firefox, or browser plug-in, to control the look and feel of the solid surface assembly 510. The expert system, when accessed online, may be integrated with an online payment and ordering system and/or data links to an enterprise resource management system(s) to enable a customer to place an order online and initialize the manufacturing process electronically. In another embodiment, the expert system is integrated into a design tool 'plug-in' module that can be integrated with common architectural and interior design programs such as Vellum® or AutoCAD®. Then, a user can interact with the expert system while they are designing a specific solid surface material application. In yet another embodiment, the expert system is integrated into a store kiosk located inside a solid surface material retailer that enables a customer to select pre-defined designs 600 or submit their own desired design 600 for a solid surface installation they are purchasing using similar methods used in the wide area access system. In still another embodiment, the expert system is integrated into a package of tools, equipment, training, and other intellectual property licenses provided to a third-party thereby enabling a consistent quality product to be delivered by multiple third-parties.

The embodiments of the invention shown in the drawings and described above are exemplary of numerous embodiments that may be made within the scope of the appended claims. It is contemplated that numerous other configurations of and processes for making solid surface interlock inserts may be created by those of ordinary skill in the art taking advantage of the disclosed approach. It is the applicant's intention that the scope of the patent issuing herefrom will be limited only by the scope of the appended claims.

What is claimed is:

1. A method of creating an interlock insert representative of a desired design in a solid surface material, comprising:
   a) creating an interlock insert design representative of the desired design;
   b) fabricating a plurality of insert sections from at least one different solid surface material each with top, side, and bottom surfaces according to said interlock insert design, wherein said plurality of insert sections comprise a first insert section and a second insert section, wherein said first insert section and said second insert section are configured to have a specific shape such that they interlock together, wherein said first insert section additionally comprises an overlap surface;
   c) forming a base pocket in said solid surface material, wherein said base pocket is sized to accept said plurality of insert sections;
   d) applying an adhesive to said base pocket and the bottom and the side surfaces of said plurality of insert sections; and
   e) assembling said first insert section and said second insert section to interlock together in said base pocket with said adhesive to create an assembled solid surface, wherein a portion of said side surface of said second insert section is in contact with said base pocket, wherein said overlap surface extends to contact the entirety of said bottom surface of said second insert section.

2. The method as defined by claim 1, further comprising the step of:
   f) finishing a top surface of said assembled solid surface.

3. The method as defined by claim 1, further comprising the steps of:
   f) placing a membrane over said assembled solid surface;
   g) applying a weight to said membrane to urge said assembled solid surface together; and
   h) removing said weight after said adhesive has cured.

4. The method as defined by claim 1, wherein said step (a) of creating said interlock insert design employs an expert system.

5. The method as defined by claim 1, wherein said solid surface material and said at least one different solid surface material are both manufactured polymer solid surface materials.

6. The method as defined by claim 1, wherein each of said plurality of insert sections is in contact with said solid surface material when installed in said base pocket.

7. The method as defined by claim 1, wherein said solid surface material comprises a top surface, and said base pocket has a floor and one or more walls; wherein said first insert section is shaped to fit within said base pocket, wherein said first insert section has a top surface, a bottom surface, and an overlap surface wherein said second insert section is shaped to fit within a space defined by said first insert section and said base pocket wherein said second insert section has a top surface and a bottom surface; wherein said adhesive affixing:

(a) said bottom surface of said second insert section to said overlap surface of said first insert section and said base pocket such that said overlap surface is substantially covered by said second insert section, and (b) said first insert section to said base pocket, wherein said top surface of said first insert section and said top surface of said second insert section form a substantially planar surface with said top surface of said solid surface material.

8. A method of creating an interlock insert representative of a desired design in a solid surface material, comprising:
   a) creating an interlock insert design representative of the desired design;
   b) fabricating a plurality of insert sections from at least one different solid surface material each with top, side, and bottom surfaces according to said interlock insert design, wherein said plurality of insert sections comprise a first insert section and a second insert section, wherein said first insert section and said second insert section are configured to interlock together, wherein said first insert section additionally comprises overlap surfaces;
   c) forming a base pocket in said solid surface material, wherein said base pocket is sized to accept said plurality of insert sections;
   d) applying an adhesive to said base pocket and the bottom and the side surfaces of said plurality of insert sections;
   e) interlocking together said first insert section and said second insert section; and
   f) creating an assembled solid surface after said plurality of insert sections are disposed within said base pocket, wherein a portion of said side surface of said second insert section is in contact with said base pocket, wherein said overlap surface extends to contact the entirety of said bottom surface of said second insert section.

9. The method as defined by claim 8, wherein said solid surface material comprises a top surface, and said base pocket has a floor and one or more walls; wherein said first insert section is shaped to fit within said base pocket, wherein said first insert section has a top surface, a bottom surface, and an overlap surface; wherein said second insert section is shaped to fit within a space defined by said first insert section and said base pocket wherein said second insert section has a top surface and a bottom surface; wherein said adhesive affixing: (a) said bottom surface of said second insert section to said overlap surface of said first insert section and said base pocket such that said overlap surface is substantially covered by said second insert section, and (b) said first insert section to said base pocket, wherein said top surface of said first insert section and said top surface of said second insert section form a substantially planar surface with said top surface of said solid surface material.

* * * * *